United States Patent
Park et al.

(10) Patent No.: US 11,024,899 B2
(45) Date of Patent: Jun. 1, 2021

(54) METHOD FOR MANUFACTURING BATTERY STACK COOLING PLATE FOR ELECTRIC VEHICLE AND COOLING PLATE MANUFACTURED THEREBY

(71) Applicant: LT PRECISION CO., LTD., Changwon-si (KR)

(72) Inventors: Yong Seok Park, Changwon-si (KR); Yeong Rok Seong, Changwon-si (KR); Seok Joo Lee, Changwon-si (KR)

(73) Assignee: LT PRECISION CO., LTD., Changwon-si (KR)

( * ) Notice: Subject to any disclaimer, the term of this patent is extended or adjusted under 35 U.S.C. 154(b) by 326 days.

(21) Appl. No.: 16/060,933

(22) PCT Filed: Feb. 15, 2016

(86) PCT No.: PCT/KR2016/001518
§ 371 (c)(1),
(2) Date: Jun. 9, 2018

(87) PCT Pub. No.: WO2017/099293
PCT Pub. Date: Jun. 15, 2017

(65) Prior Publication Data
US 2020/0266505 A1    Aug. 20, 2020

(30) Foreign Application Priority Data

Dec. 11, 2015  (KR) ........................ 10-2015-0177243
Dec. 16, 2015  (KR) ........................ 10-2015-0179810

(51) Int. Cl.
*B23K 1/00*      (2006.01)
*H01M 10/6554*   (2014.01)
(Continued)

(52) U.S. Cl.
CPC ....... *H01M 10/6554* (2015.04); *B23K 1/0016* (2013.01); *B23K 1/203* (2013.01);
(Continued)

(58) Field of Classification Search
CPC .......... H01M 10/6554; H01M 10/613; H01M 10/625; H01M 2220/20; H01M 10/6556;
(Continued)

(56) References Cited

U.S. PATENT DOCUMENTS 3,703,254 A * 11/1972 Maierson ........... B23K 35/0244
                                                  428/407
3,736,653 A *  6/1973 Maierson ........... B23K 35/0244
                                                  228/224
(Continued)

FOREIGN PATENT DOCUMENTS

CN      102873491 A      1/2013
DE      101 38 555 A1    2/2003
(Continued)

OTHER PUBLICATIONS

Machine translation of KR20150081514A (no date available).*

*Primary Examiner* — Kiley S Stoner
(74) *Attorney, Agent, or Firm* — Maschoff Brennan

(57) ABSTRACT

The present invention relates to a method for manufacturing a battery stack cooling plate for an electric vehicle, the method comprising: a plastic working step for plastic working each of an upper plate and a lower plate which are made of a clad material and constitute a cooling plate; a preheating step for preheating each of the upper plate and the lower plate; a coating step for coating a flux on the upper plate and the lower plate; and a brazing step for heating the upper plate and the lower plate in a state where the clad materials of the
(Continued)

upper plate and the lower plate are in contact with each other, so as to bond the upper plate and the lower plate together.

10 Claims, 14 Drawing Sheets

(51) Int. Cl.
    *H01M 10/613*      (2014.01)
    *H01M 10/625*      (2014.01)
    *B60L 58/26*      (2019.01)
    *B23K 1/20*      (2006.01)
    *B23K 101/36*      (2006.01)
    *B60L 50/60*      (2019.01)
    *B60K 1/04*      (2019.01)
    *B60K 6/28*      (2007.10)

(52) U.S. Cl.
    CPC ........... *B60L 58/26* (2019.02); *H01M 10/613* (2015.04); *H01M 10/625* (2015.04); *B23K 2101/36* (2018.08); *B60K 1/04* (2013.01); *B60K 6/28* (2013.01); *B60L 50/60* (2019.02); *B60Y 2200/91* (2013.01); *B60Y 2200/92* (2013.01); *B60Y 2306/05* (2013.01); *H01M 2220/20* (2013.01)

(58) Field of Classification Search
    CPC ....... B60L 58/26; B60L 50/60; B23K 1/0016; B23K 2101/36; B23K 1/203; B23K 3/082; B23K 3/3638; B23K 35/025; B60K 1/04; B60K 6/28; B60Y 2200/91; B60Y 2200/92; B60Y 2306/05; C23C 2/06
    USPC .............................. 228/207, 223–224, 248.1
    See application file for complete search history.

(56) References Cited

U.S. PATENT DOCUMENTS

| | | | |
|---|---|---|---|
| 5,174,490 | A * | 12/1992 | Koisuka ............... B23K 1/0012 228/183 |
| 2019/0277578 | A1* | 9/2019 | Bardeleben ............... F28F 3/04 |
| 2019/0366876 | A1* | 12/2019 | Cheadle .................. B60L 58/27 |
| 2020/0132387 | A1* | 4/2020 | Girmscheid .......... F28D 1/0417 |
| 2020/0136205 | A1* | 4/2020 | Graves ................ H01M 10/613 |
| 2020/0136214 | A1* | 4/2020 | Graves ............. H01M 10/6552 |
| 2020/0240721 | A1* | 7/2020 | Kenney ..................... F28F 3/14 |
| 2020/0248973 | A1* | 8/2020 | Subramanyam .. H01M 10/6554 |

FOREIGN PATENT DOCUMENTS

| | | |
|---|---|---|
| EP | 0292565 A1 | 11/1988 |
| EP | 1808255 A1 * | 1/2006 |
| EP | 1808255 A1 | 7/2007 |
| JP | 2933392 B | 8/1999 |
| KR | 10-0339746 | 7/2001 |
| KR | 10-2008-0084825 A | 9/2008 |
| KR | 10-1015348 B1 | 2/2011 |
| KR | 10-2013-0112117 A | 10/2013 |
| KR | 10-2015-0081514 A | 7/2015 |
| KR | 10-2015-0081516 A | 10/2015 |
| WO | 2014-030910 A1 | 2/2014 |

* cited by examiner

[FIG. 1]
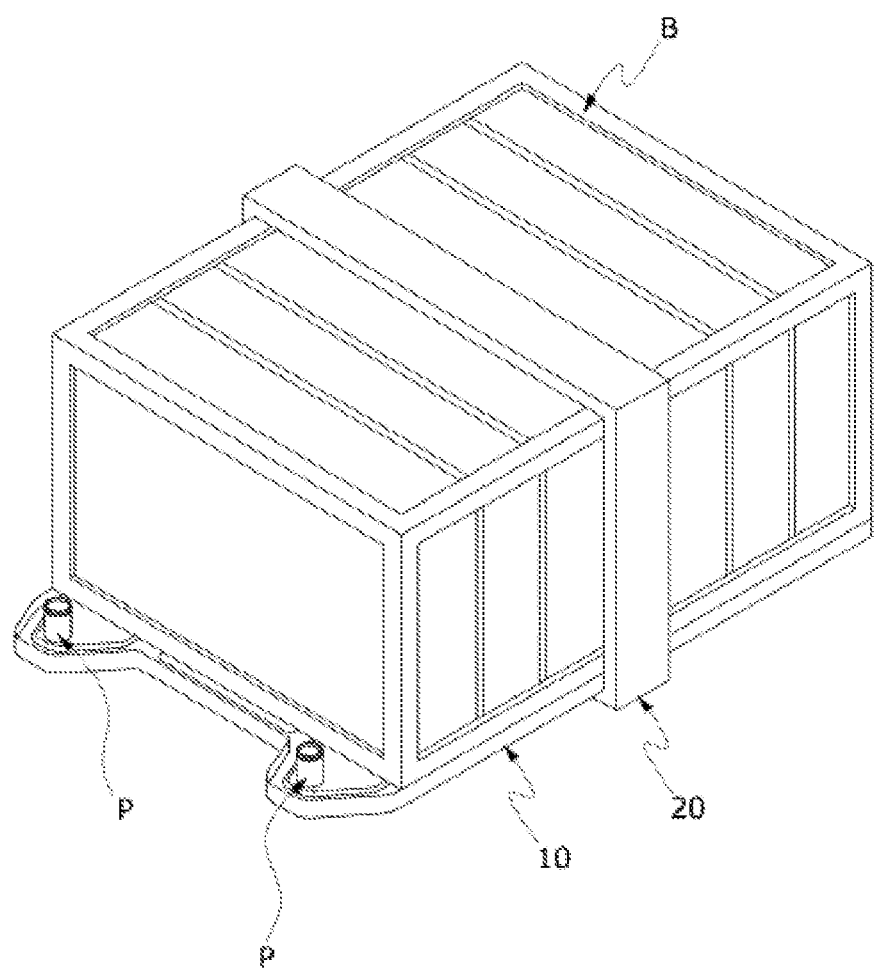

[FIG. 2]
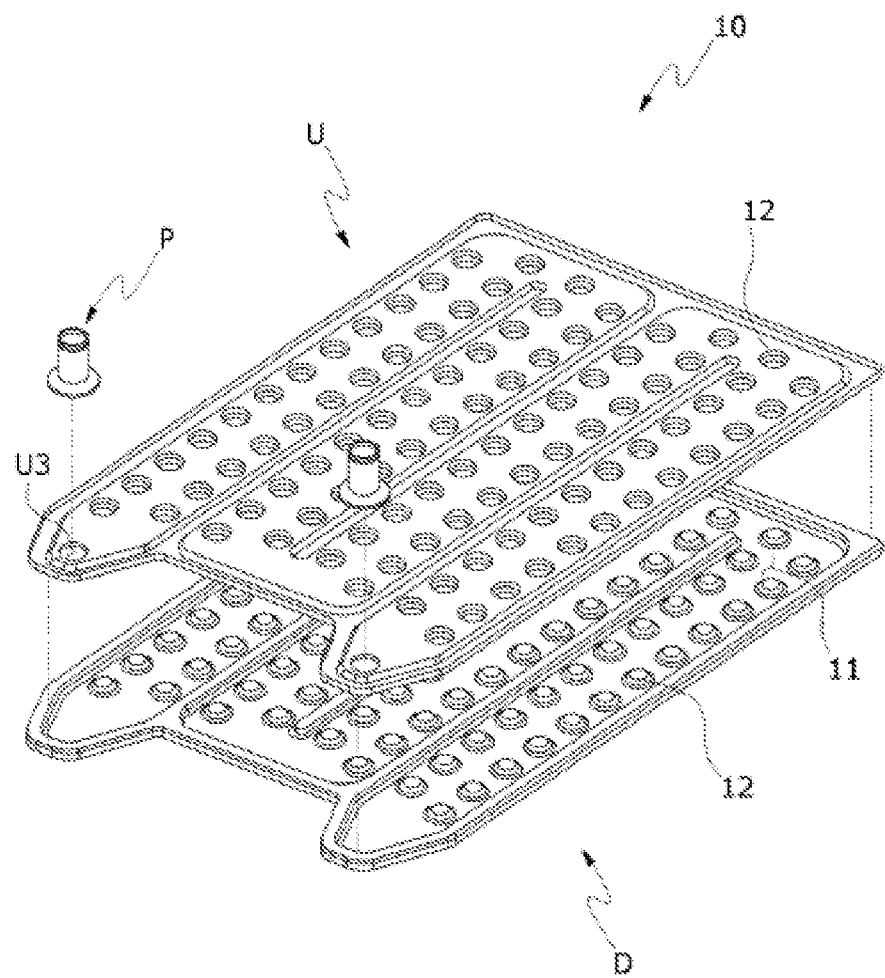

[FIG. 3]
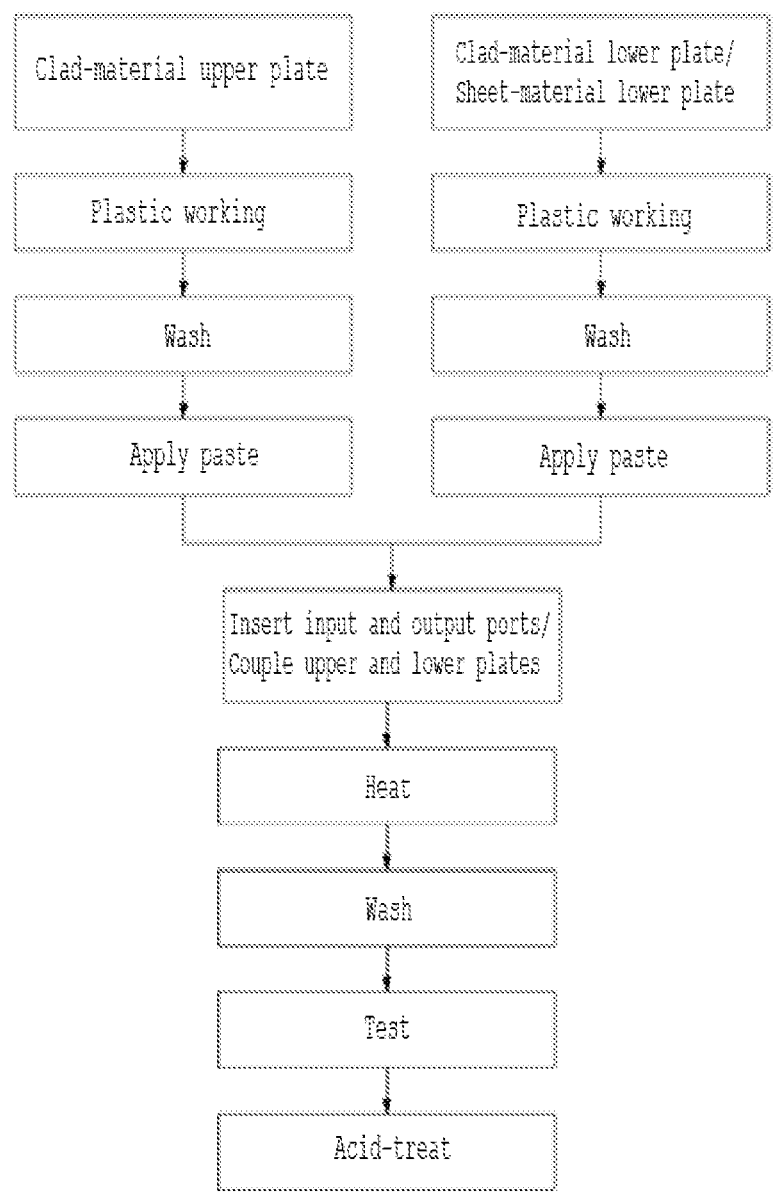

[FIG. 4]
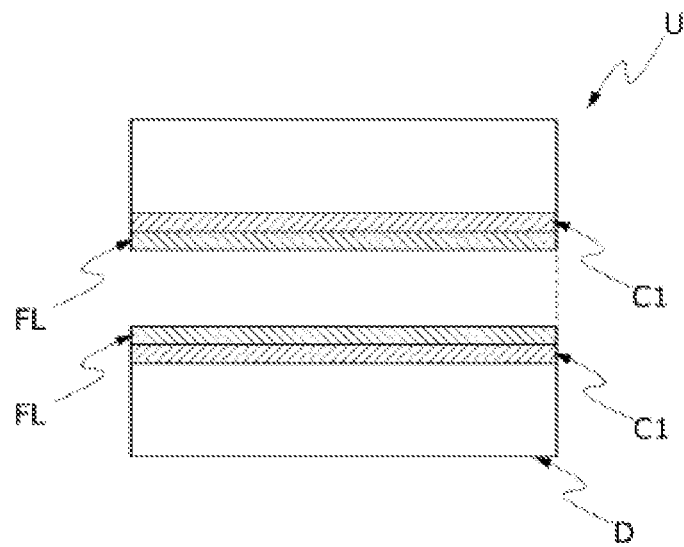
[FIG. 5]
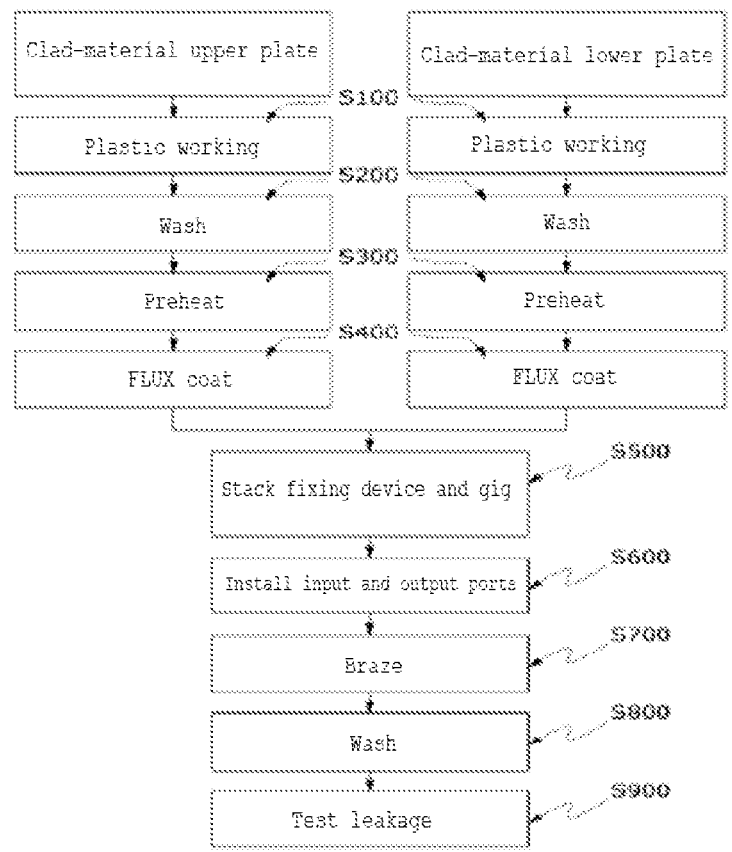

[FIG. 6]
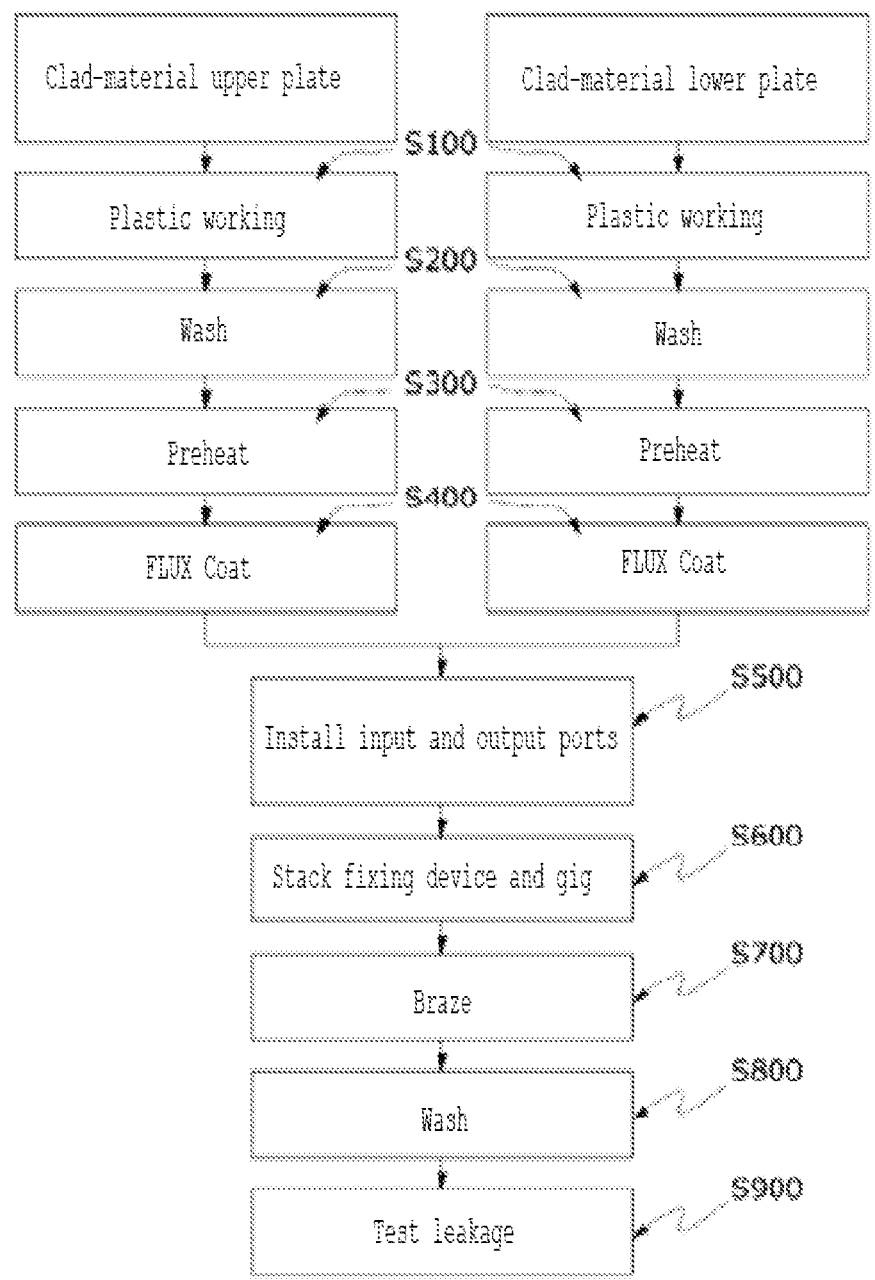

[FIG. 7]
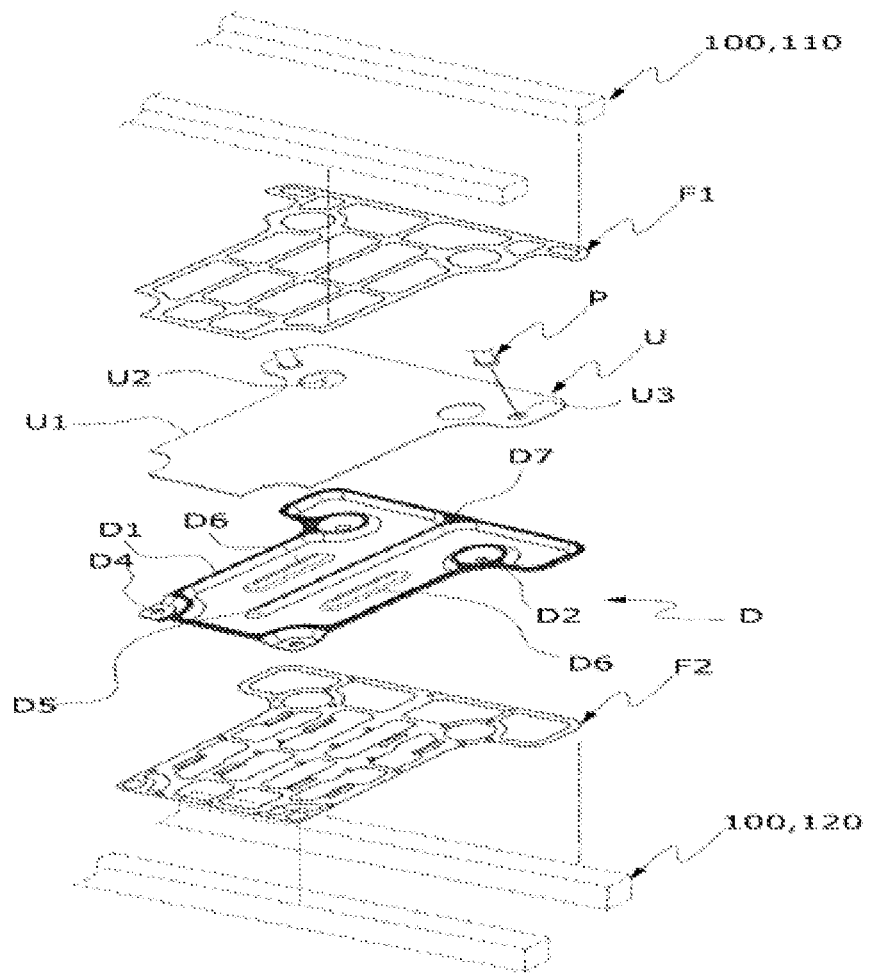

[FIG. 8]
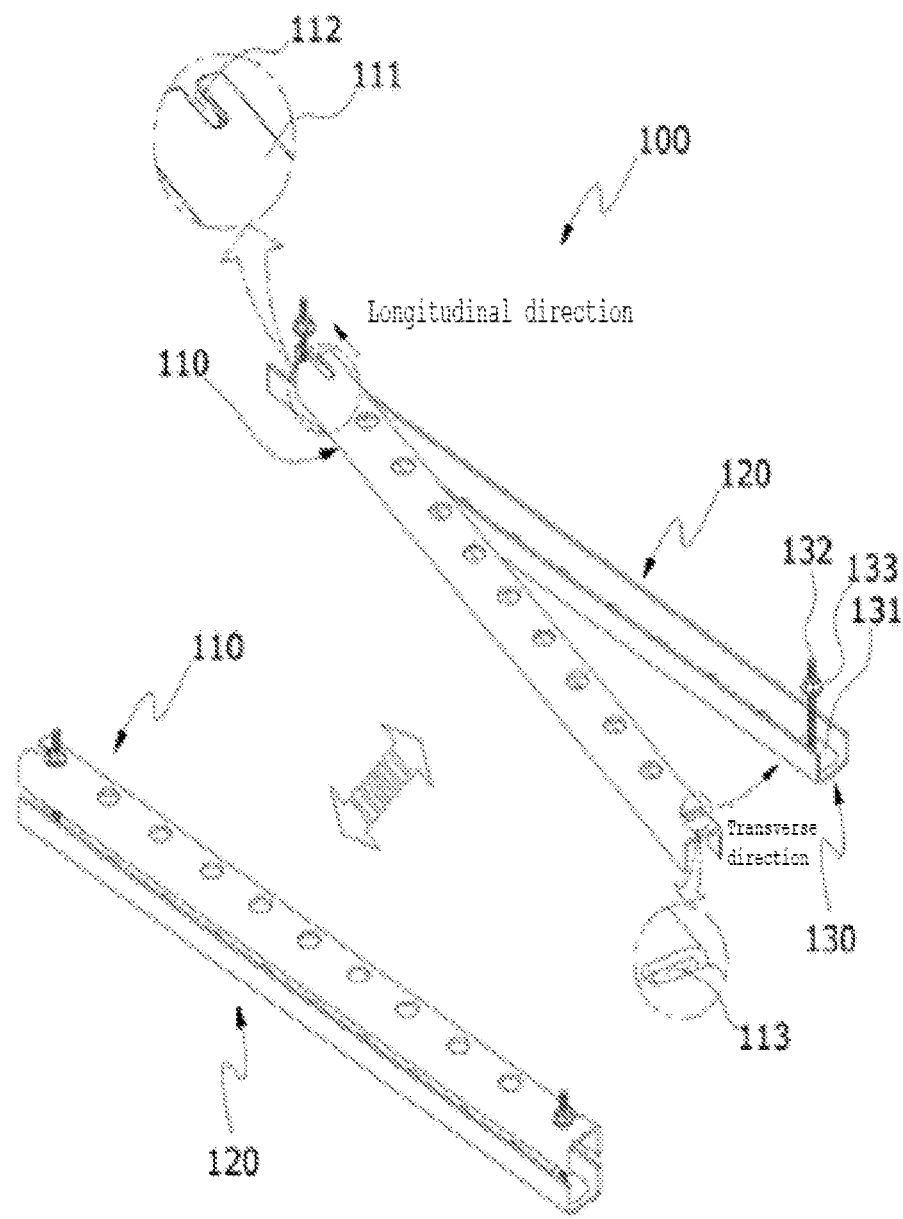

[FIG. 9]
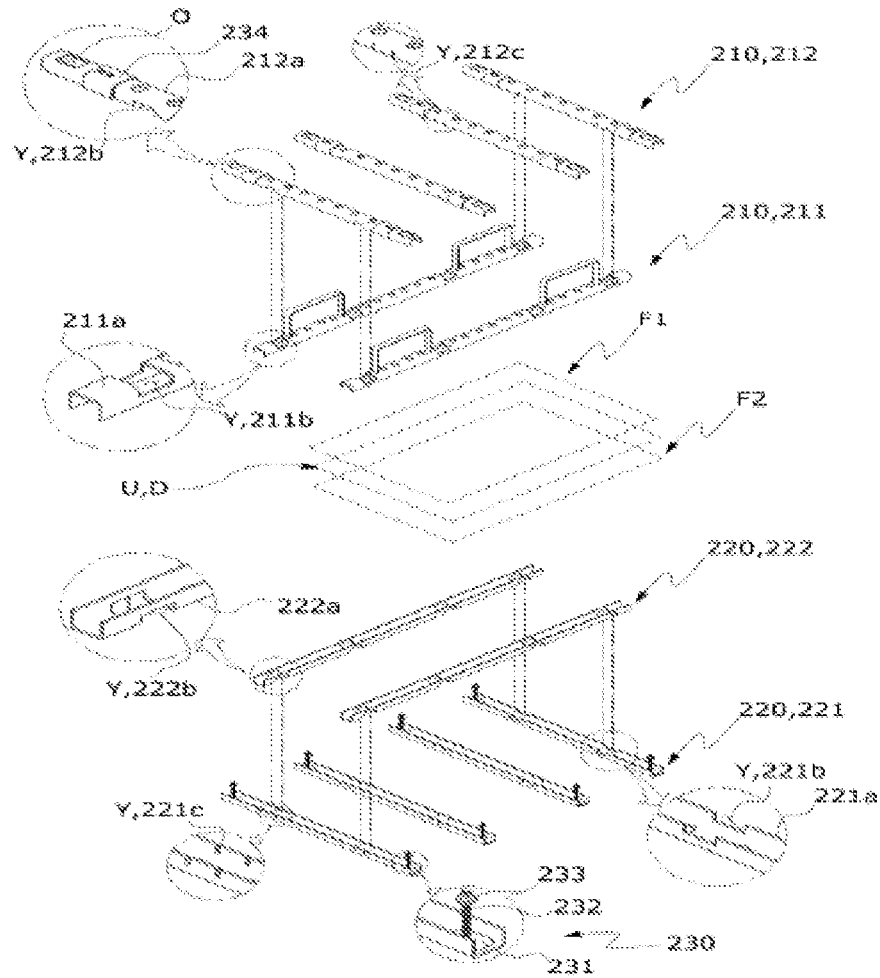
[FIG. 10]
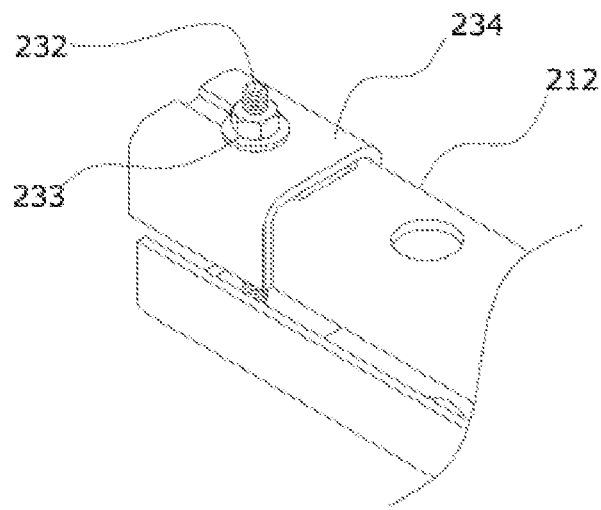

[FIG. 11]
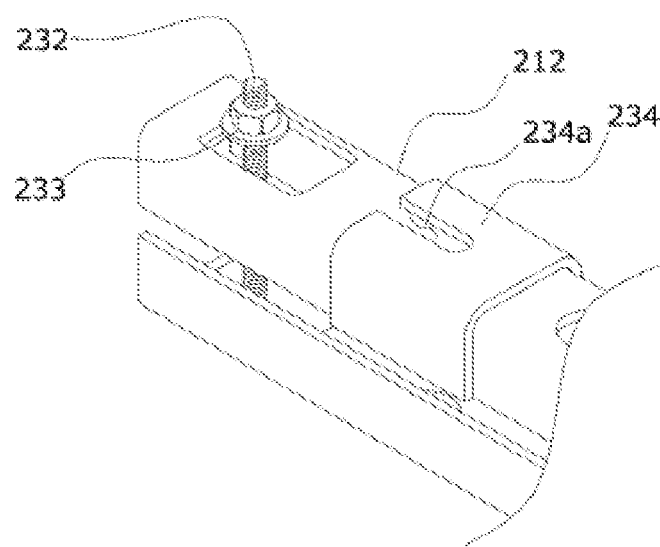
[FIG. 12]
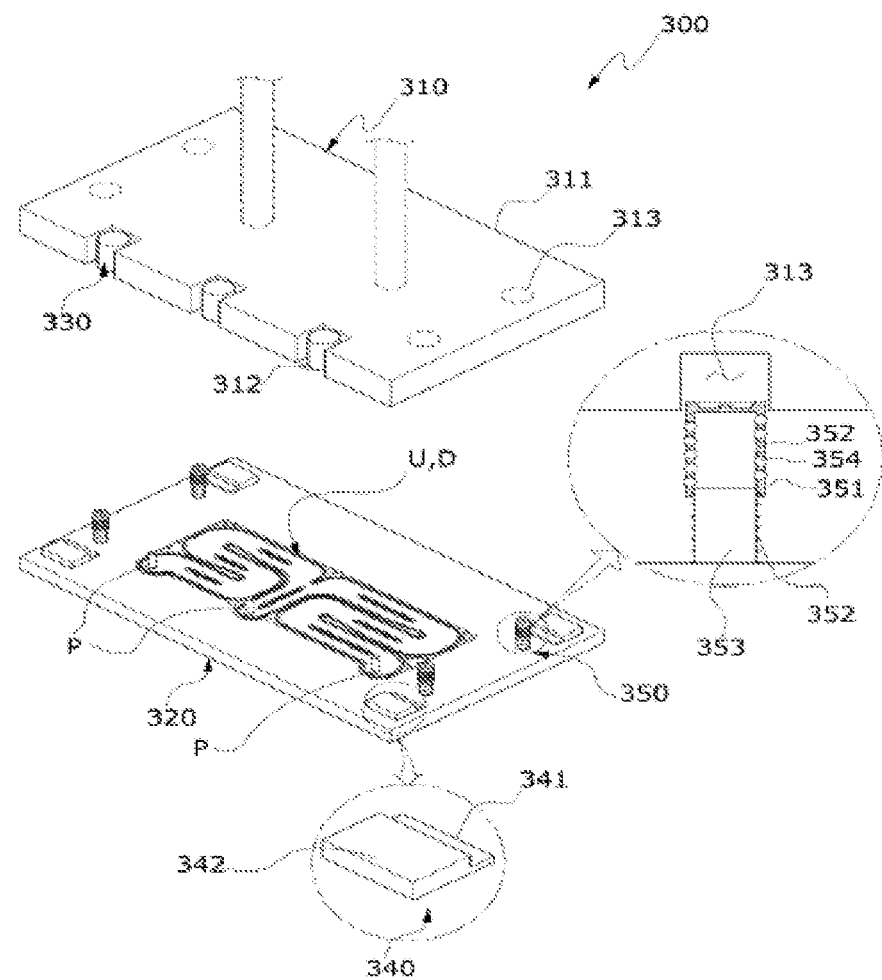

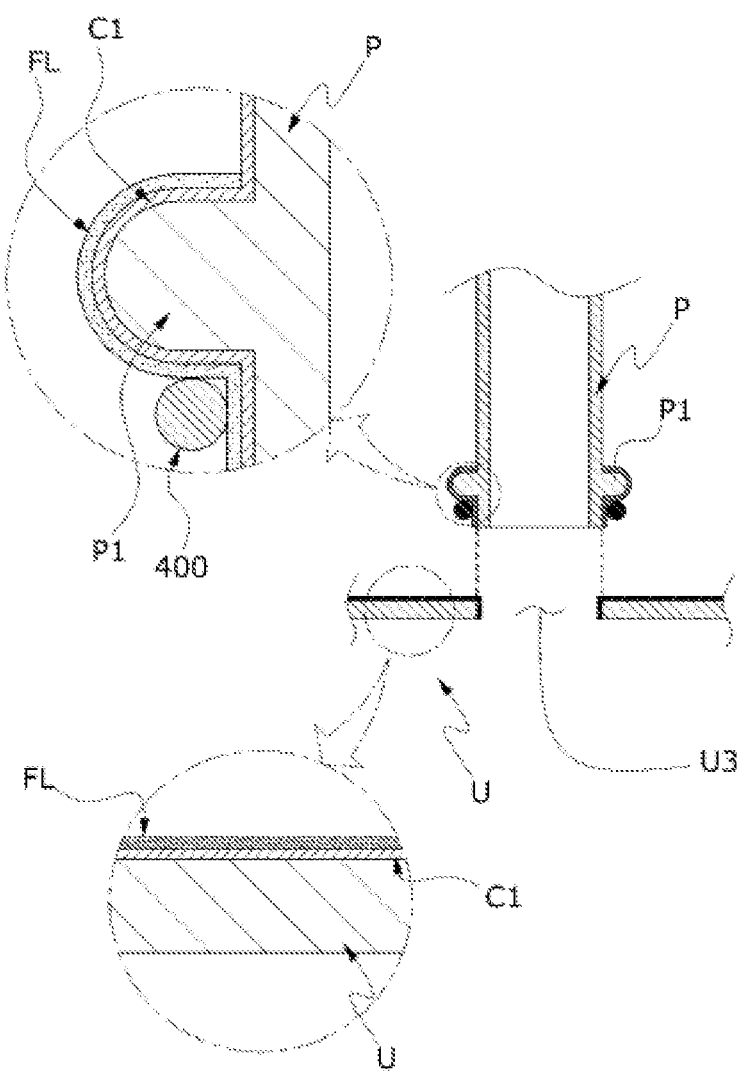
[FIG. 13]

[FIG. 14]
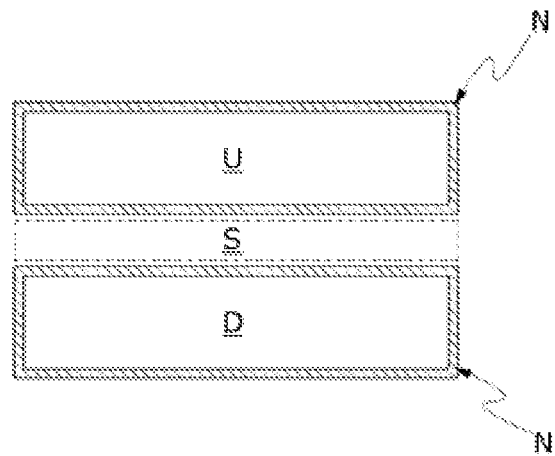
[FIG. 15]
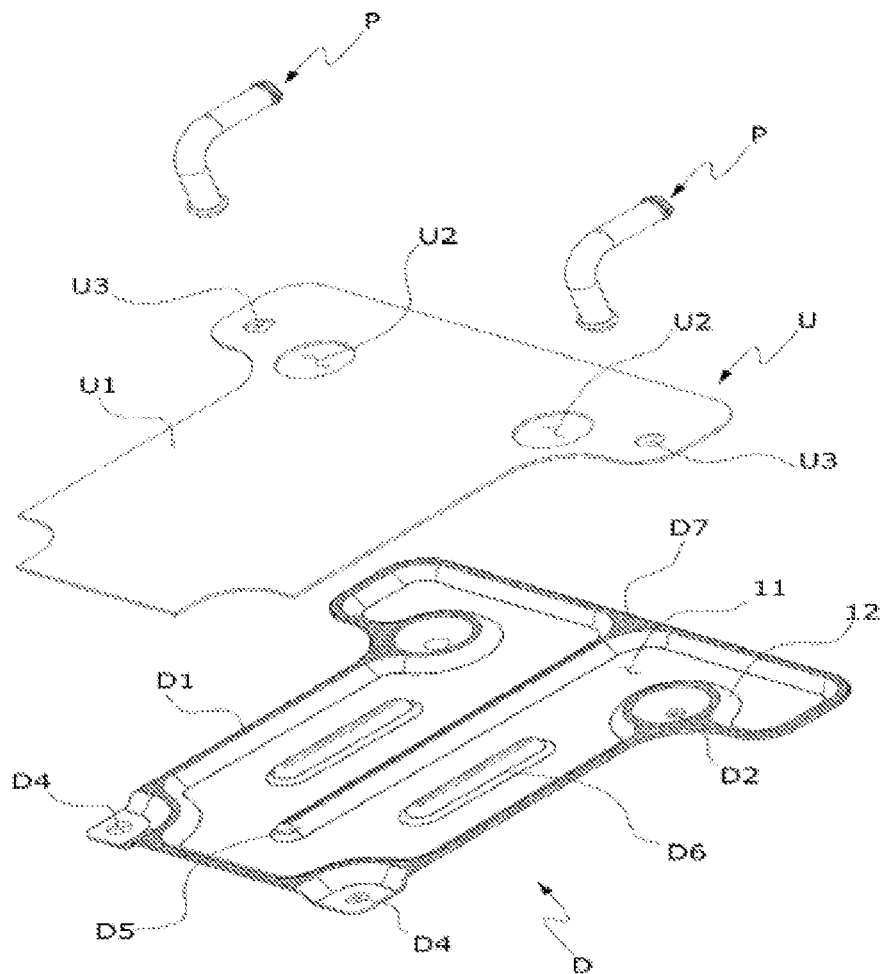

[FIG. 16]
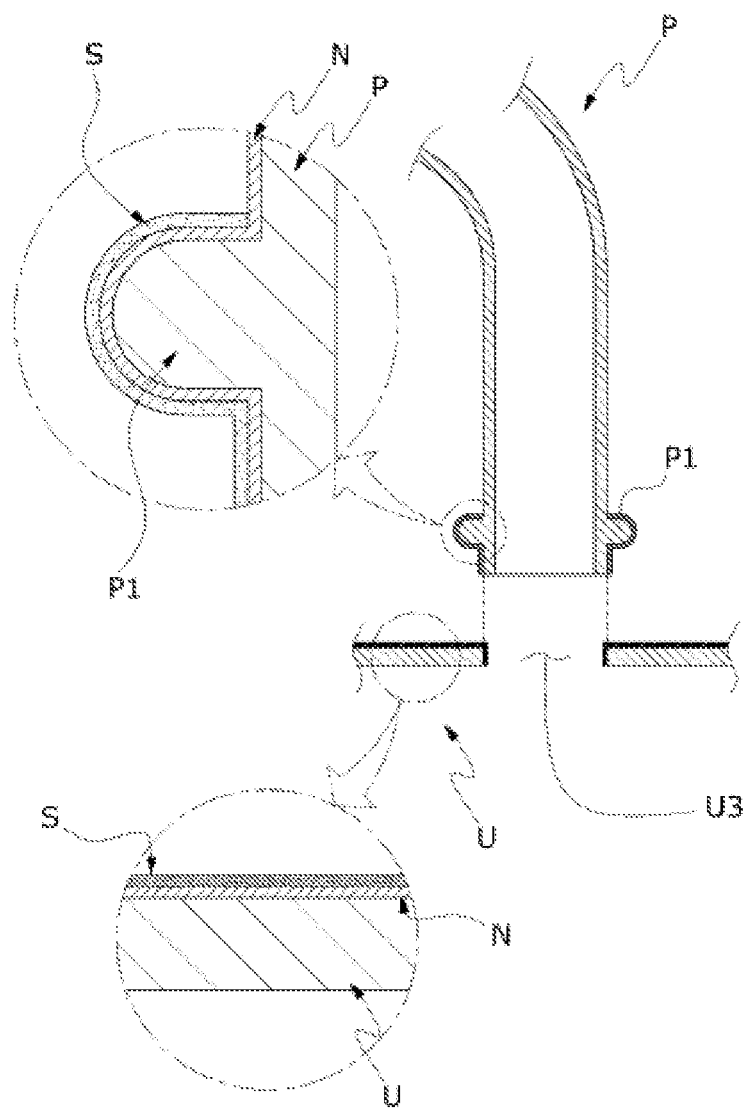

[FIG. 17]
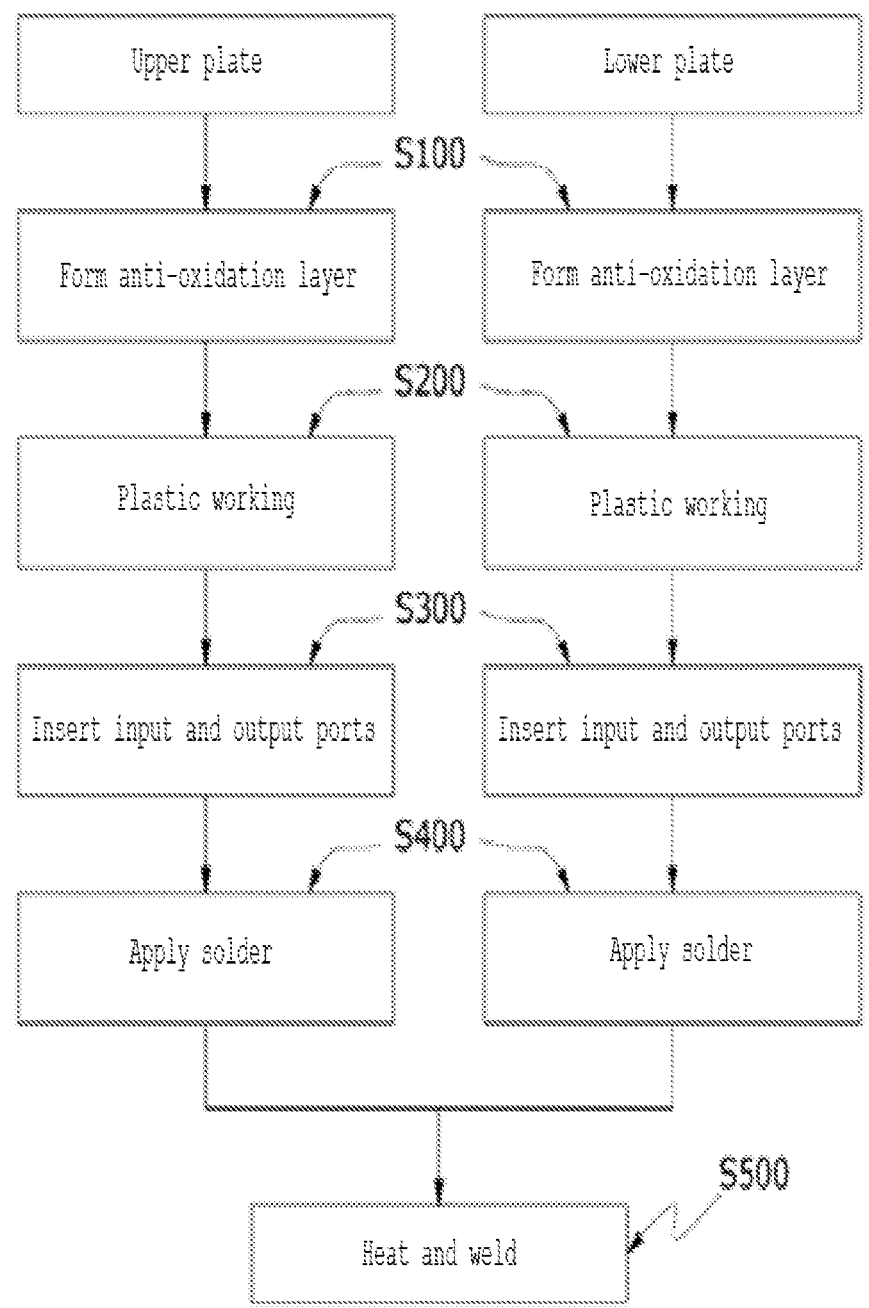

[FIG. 18]
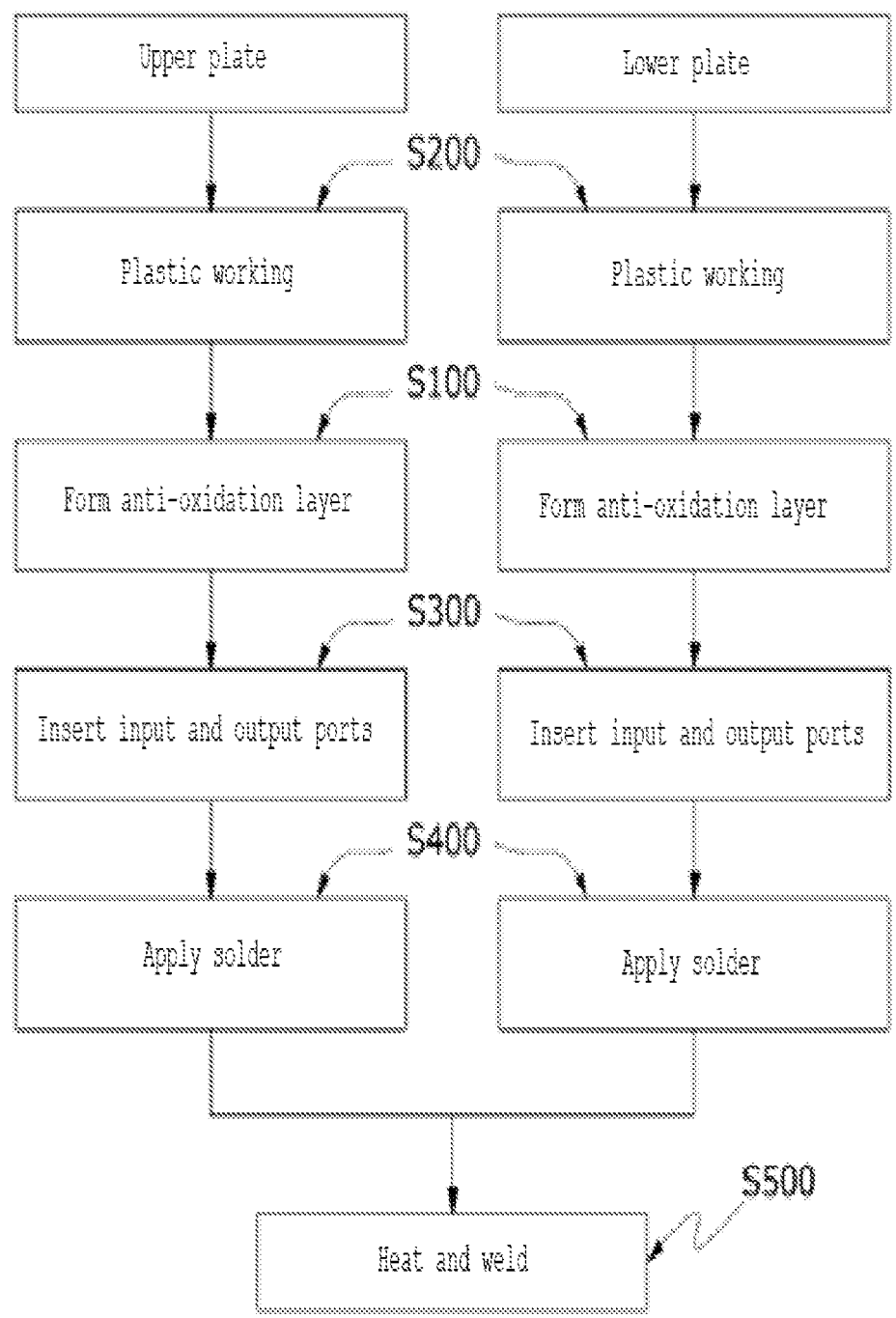

METHOD FOR MANUFACTURING BATTERY STACK COOLING PLATE FOR ELECTRIC VEHICLE AND COOLING PLATE MANUFACTURED THEREBY

TECHNICAL FIELD

The present invention relates to a method for manufacturing a battery stack cooling plate for an electric vehicle and a cooling plate manufactured thereby, in which an upper plate and a lower plate are preheated, flux is applied at the upper and lower plates, moisture is removed at first, and all the moisture remaining at the flux is removed in a brazing step where the upper and lower plates are heated and welded such that the upper and lower plates are fixedly coated with the flux and as a result, firmly welded by the flux.

RELATED ART

In general, electric vehicles are powered by electricity and are divided into pure ones and hybrid ones. Pure electric vehicles are powered only by batteries not by fossil fuels while hybrid electric vehicles are powered by both fossil fuels and batteries.

Such an electric vehicle includes a high-voltage battery stack consisting of a plurality of batteries. In particular, the battery stack generates a significant amount of heat during charge and discharge.

Additionally, the heat generated by the battery stack leads to the poor performance and shorter lifespan of the battery. Conventionally, the cooling plate 10 illustrated in FIG. 1 has been used.

The cooling plate 10 is installed at the bottom surface of the battery stack B and fixed to the battery stack B by a fixing part 20.

Meanwhile, the cooling plate 10, as illustrated in FIG. 2, includes an upper plate U and a lower plate D. In this case, the bottom surface of the upper plate U and the upper surface of the lower plate include spacers 12 that protrude in the direction where the spacers, respectively formed at the bottom surface of the upper plate U and the upper surface of the lower plate D, are facing each other, and fluid paths 11 are formed at the space created by the spacers 12 between the upper plate U and the lower plate D.

Cooling water (invisible) absorbs heat generated by the battery stack B while flowing through the fluid paths 11.

In this case, the upper plate U has port fixing holes U3 into which input and output ports P are inserted and mounted, and cooling water flows into and out of the input and output ports P.

Meanwhile, the above-described upper U and lower D plates, as illustrated in FIGS. 3 and 4, are fixed to each other by means of braze-welding.

That is, aluminum such as AL3003 U may be used as a material for the upper plate U, a clad material C1 is stacked at the surface of the upper plate U facing the lower plate D out of the surfaces of the upper plate U—i.e. the lower side in FIG. 4, and AL4045, a sort of aluminum may be used a material for the clad material C1.

Similarly, a clad material C1 is stacked at the upper surface of the lower plate D.

Plastic working is performed first to the upper U and lower D plates to which the clad materials C1 are attached. The upper plate U has port insertion holes U3, and plastic working is performed to the upper plate U such that spacers 12 are formed. Further, plastic working is also performed to the lower plate D such that spacers 12 are formed.

Meanwhile, the plastic working-done upper U and lower plates are washed, and paste is applied at the clad materials C1, and afterwards, the paste-applied clad materials C1 of the upper U and lower D plates are coupled so as to face each other.

In this case, the input and output ports P may be installed at the upper plate U after the upper U and lower D plates are coupled, or the upper U and lower D plates may be coupled after the input and output ports P may be installed at the upper plate U.

Then, the upper and lower plates are heated and braze-welded.

Meanwhile, after being welded, the upper U and lower D plates are washed and afterwards, tested as to whether or not the upper U and lower D plates may withstand certain pressure, and finally, acid-treated.

However, there is a problem with the above-described braze-welding method using paste. The problem is that flux applied to the clad materials C1 is not fixedly attached and stays in a powder form because moisture remains in the paste. As a result, the upper and lower plates are not perfectly welded.

Further, the temperature for heating and brazing the upper U and lower D plates is about 620° C., which is higher than the recrystallization temperature of aluminum, thereby causing the softening of the material of the upper U and lower D plates. As a result, the strength of the material of the upper U and lower D plates is lowered while the deformation of the material of the upper U and lower D plates is caused.

Meanwhile, the above-described braze-welding method in relation to a battery stack cooling plate for an electric vehicle is widely known and will be described in detail in the following prior art documents. Accordingly, description and illustration regarding this will not be repeated.

DETAILED DESCRIPTION OF THE INVENTION

Technical Problems

As a means to solve the above-described problems, the present invention is directed to providing a method for manufacturing a battery stack cooling plate for an electric vehicle and a cooling plate manufactured thereby, in which an upper plate and a lower plate are preheated, flux is applied at the upper and lower plates, moisture is removed at first, and all the moisture remaining at the flux is removed in a brazing step where the upper and lower plates are heated and welded such that the upper and lower plates are fixedly coated with the flux and as a result, firmly welded by the flux.

Further, the present invention is directed to providing a method for manufacturing a battery stack cooling plate for an electric vehicle and a cooling plate manufactured thereby, in which solder available at low temperatures is used to weld the upper and lower plates thereby preventing lower strength and deformation; accordingly, a testing step may be omitted, and conventional flux is not used such that a washing step and an acid treating step may be omitted thereby reducing the manufacturing costs.

However, the purpose of the present invention is not limited to the above-described purposes, and other purposes will become apparent to those skilled in the art to which the present invention pertains from the following descriptions.

Technical Solutions

As a means to achieve the above-described purposes, the present invention provides a method for manufacturing a battery stack cooling plate for an electric vehicle including a plastic working step in which plastic working is performed respectively to clad-material upper and lower plates constituting a cooling plate, a preheating step in which the upper and lower plates are respectively preheated, a coating step in which the upper and lower plates are coated with flux, and a brazing step in which the upper and lower plates are heated and welded in the state where the upper and lower plates contact each other.

In the preheating step, the upper plate and the lower plate are heated at temperatures ranging from 180° C. to 200° C.

In the brazing step, the upper plate and the lower plate are heated at temperatures ranging from 590° C. to 640° C.

Before the brazing step, there are a stacking step in which the flux-coated upper plate is disposed to contact the clad material of the lower plate, and an upper fixing device and a lower fixing device are disposed respectively at the upper surface of the upper plate and the bottom surface of the lower plate, and then, jigs are respectively stacked on the upper surface of the upper fixing device and the bottom surface of the lower fixing device, and an input and output port installing step in which input and output ports are installed in input and output port insertion holes of the upper plate.

Before the brazing step, there are an input and output port installing step in which input and output ports are installed in port insertion holes of the upper plate, and a stacking step in which after the flux-coated upper and lower plates are assembled, an upper fixing device and a lower fixing device are disposed respectively at the upper surface of the assembled upper plate and the bottom surface of the assembled lower plate, and jigs are respectively stacked on the upper surface of the upper fixing device and the bottom surface of the lower fixing device.

In the input and output port installing step, clad rings made from clad materials are installed at portions where the input and output ports and the upper plate come into contact.

The jig includes an upper jig disposed at the upper portion of the upper fixing device, a lower jig disposed at the bottom surface of the lower fixing device, and fixing parts for fixing the upper jig and the lower jig, wherein the upper jig includes an upper jig body with a ∩-shaped cross section, a first insertion groove which is formed at the upper surface of the the end of the upper jig body in the longitudinal direction thereof and grooved in the longitudinal direction of the upper jig body, and a second insertion groove which is grooved at one side of the upper jig body in the transverse direction thereof and formed in a direction perpendicular to the first insertion groove, wherein the lower jig includes a lower jig body with a U-shaped cross section, wherein the fixing parts include bases which are respectively fixed to the inner floor surfaces of both sides of the lower jig body, screw parts which are respectively installed at the bases, and locking parts which are respectively screwed into the screw parts, wherein in the stacking step, the lower jig is disposed at the lowest layer, and the lower fixing device is disposed on the lower jig, the upper and lower plates where clad materials contact each other are disposed on the lower fixing device, the upper fixing device is disposed on the upper plate, and on the top of this, the upper jig is disposed in the same direction as the lower jig, the upper jig moves in the longitudinal direction thereof so as to insert the first insertion groove to the screw part, the upper jig rotates around the screw part so as to insert the other screw part into the second insertion groove and afterwards, the upper jig and the lower jig are fixed to each other by means of the locking part.

The jig includes an upper jig disposed at the upper portion of the upper fixing device, a lower jig disposed at the bottom surface of the lower fixing device, and a fixing part for fixing the upper jig and the lower jig, wherein the upper jigs include a first upper jig and a second upper jig which are disposed above and below to be perpendicular to each other, and coupling grooves are respectively formed at crossed parts out of the first upper jig and the second upper jig, wherein the lower jigs include a first lower jig and a second lower jig which are disposed above and below to be perpendicular to each other, and coupling grooves are respectively formed at crossed parts out of the first lower jig and the second lower jig.

The first upper jig includes first upper jig bodies with a ∩-shaped cross section, and first upper coupling grooves where the upper surface of the first upper jig bodies, and parts of both sides adjacent to the upper surface of the first upper jig bodies are opened and where the opened parts at both sides are opened to a certain height from the upper portion of the first upper jig bodies, and the second upper jig includes second upper jig bodies with a ∩-shaped cross section, and second upper coupling grooves where parts of the second upper jig bodies are opened from the floors of both sides of the second upper jig bodies, wherein the first lower jigs include first lower jig bodies with a U-shaped cross section, and first lower coupling grooves where parts of the first lower jig bodies are opened from the upper end of the first lower jig bodies out of both sides thereof in the height direction thereof, and the second lower jigs include second lower jig bodies with a U-shaped cross section, and second lower coupling grooves where the floor surface of the second lower jig bodies and parts of both side adjacent to the floor surface of the second lower jig bodies are opened and where the opened parts at both sides are opened from the floor surface of the second lower jig bodies in the height direction thereof, wherein the first lower jigs are disposed in a certain, and afterwards, on the top of this, the second lower jigs are disposed on the first lower jigs in the direction perpendicular to the first lower jigs, the second lower coupling grooves are coupled to the first lower coupling grooves, the lower fixing device is disposed on the lower jig, the upper and lower plates where clad materials contact each other are disposed on the lower fixing device, the first upper jig is disposed on the upper plate in the same direction as the second lower jig, and on the top of this, the second upper jig is disposed, and the second upper coupling grooves are coupled to the first upper coupling grooves.

Opened parts are formed at parts of the upper surfaces of both sides of the second upper jig, and fixing parts are installed at the first lower jig, wherein the fixing parts include bases which are respectively fixed to the inner floor surfaces of both sides of the second lower jig, screw parts which are respectively installed at the bases, locking parts which are respectively screwed into the screw parts, and sliding members which are movably installed at the second upper jig, the screw parts and locking parts penetrate the opened parts of the second upper jig such that the screw parts and locking parts are exposed, the sliding members are provided with opened slits which are formed from both ends of the second upper jig towards the center thereof to have a certain length such that the screw parts are inserted; wherein when the upper jig and the lower jig are fixed, the sliding member installed on the second upper jig is disposed to cover the opened part, and afterwards, the locking part which is exposed by penetrating the opened part and the opened slit descends to press and fix the sliding member, the locking part coupled to the screw part ascends such that the sliding member is released from fixation when the upper jig is desired to separate, and the opened part is exposed by moving the sliding member such that the second upper jig is separated from the first upper jig.

After the brazing step, the step of testing whether the welded upper and lower plates are leaked is performed, wherein a test device necessary for the leakage testing step is installed at a press part that is ascendably and descendably installed and at the bottom surface thereof and includes a base part at which the welded upper and lower plates are installed, wherein fluid injection parts are installed at one side of the press part so as to inject fluid between the welded upper and lower plates, guide units are installed on the base part in the direction of the press part so as to be inserted into coupling grooves of the press part, and space units are installed at one side of the guide units such that the press part stays away from the base part as much as the thickness of the upper and lower plates protruding from the base part when the press part descends.

Further, the present invention provides a battery stack cooling plate for an electric vehicle manufactures by the above-described method.

The features and advantages of the present invention will become apparent from the following description with reference to the attached drawings.

Terms or words used in the specification and the appended claims should not be interpreted as those that are usual or defined in commonly used dictionaries. Terms or words used herein should be interpreted as those with a meaning in accordance with the technical spirit of the present invention on the basis of the principle that the terms and words need to be properly defined such that the inventor may best describe the present invention.

Advantageous Effects

According to the above-described present invention all the moisture remaining at the flux is removed in a brazing step in which upper and lower plates are welded such that the upper and lower plates are fixedly coated with flux and as a result, firmly welded by the flux.

Further, according to the present invention, solder available at low temperatures is used to weld the upper and lower plates thereby preventing lower strength and deformation; accordingly, conventional flux is not used such that a washing step and an acid treating step may be omitted thereby reducing the manufacturing costs.

BRIEF DESCRIPTION OF THE DRAWINGS

FIG. 1 is a perspective view illustrating a battery stack for a usual electric vehicle and the battery stack equipped with a cooling plate.

FIG. 2 is an exploded perspective view illustrating an example of a conventional cooling plate.

FIG. 3 is a flow chart illustrating a method for manufacturing a conventional cooling plate.

FIG. 4 is a schematic diagram illustrating a conventional method for braze-welding.

FIG. 5 is a flow chart illustrating a method for manufacturing a cooling plate according to an embodiment of the present invention.

FIG. 6 is a flow chart illustrating a method for manufacturing a cooling plate according to another embodiment of the present invention.

FIG. 7 is an exploded view illustrating how a fixing device and a jig are stacked in terms of a method for manufacturing a cooling plate according to an embodiment of the present invention.

FIG. 8 includes a coupled perspective view and an exploded perspective view illustrating states where a fixing device and a jig are coupled and separated in terms of a method for manufacturing a cooling plate according to an embodiment of the present invention, and upper and lower plates, and upper and lower fixing devices are omitted.

FIG. 9 is an exploded perspective view illustrating yet another relationship in which a fixing device and a jig are coupled and separated in terms of a method for manufacturing a cooling plate according to an embodiment of the present invention, and upper and lower plates and upper and lower fixing devices are schematically illustrated.

FIG. 10 is a perspective view illustrating a state where a sliding member covers an opened part of a second upper jig in terms of a method for manufacturing a cooling plate according to an embodiment of the present invention.

FIG. 11 is a perspective view illustrating a state where a sliding member moves to expose an opened part of a second upper jig in terms of a method for manufacturing a cooling plate according to an embodiment of the present invention.

FIG. 12 is a perspective view illustrating a device for testing airtightness of a cooling plate manufactured by means of a method for manufacturing a cooling plate according to an embodiment of the present invention.

FIG. 13 is a perspective view illustrating input and output ports installed in port insertion holes of an upper plate in terms of a method for manufacturing a cooling plate according to an embodiment of the present invention.

FIG. 14 is a schematic diagram illustrating a method for manufacturing a cooling plate according to another embodiment of the present invention.

FIG. 15 is an exploded perspective view illustrating an example of a cooling plate of the present invention.

FIG. 16 is a schematic diagram illustrating input and output ports welded to an upper plate in terms of a cooling plate at which a method of the present invention may be applied.

FIG. 17 is a flow chart illustrating a method for manufacturing a cooling plate according to another embodiment of the present invention.

FIG. 18 is a flow chart illustrating a method for manufacturing a cooling plate according to yet another embodiment of the present invention.

MODE FOR CARRYING OUT THE INVENTION

Below, preferred embodiments of the present invention will be described with reference to the attached drawings. During description of the embodiments, the illustrated lines or the size of elements may be exaggerated for the sake of convenience and clarity in description.

Further, the terms that will be described hereunder are those defined considering the functions described in the present invention and may differ depending on the intention or the practice of the user or operator. Therefore, such terms should be defined on the basis of what is described throughout the specification.

Additionally, the following embodiments are provided only as examples of the elements presented in the appended claims of the present invention, and the present invention should not be construed as being limited to the embodiments set forth herein. Further, the embodiments are included within the technical spirit and scope of the present invention, and the embodiments including replaceable elements as equivalents in the elements of the appended claims may be included in the scope of the protection of the present invention.

FIG. 5 is a flow chart illustrating a method for manufacturing a cooling plate according to an embodiment of the present invention, FIG. 6 is a flow chart illustrating a method for manufacturing a cooling plate according to another embodiment of the present invention, FIG. 7 is an exploded view illustrating how a fixing device and a jig are stacked in terms of a method for manufacturing a cooling plate according to an embodiment of the present invention, FIG. 8 includes a coupled perspective view and an exploded perspective view illustrating states where a fixing device and a jig are coupled and separated in terms of a method for manufacturing a cooling plate according to an embodiment of the present invention, and omits upper and lower plates, and upper and lower fixing devices, FIG. 9 is an exploded perspective view illustrating yet another relationship in which a fixing device and a jig are coupled and separated in terms of a method for manufacturing a cooling plate according to an embodiment of the present invention, FIG. 10 is a perspective view illustrating a state where a sliding member covers an opened part of a second upper jig in terms of a method for manufacturing a cooling plate according to an embodiment of the present invention, FIG. 11 is a perspective view illustrating a state where a sliding member moves to expose an opened part of a second upper jig in terms of a method for manufacturing a cooling plate according to an embodiment of the present invention, FIG. 12 is a perspective view illustrating a device for testing airtightness of a cooling plate manufactured by means of a method for manufacturing a cooling plate according to an embodiment of the present invention, and FIG. 13 is a perspective view illustrating input and output ports installed in port insertion holes of an upper plate in terms of a method for manufacturing a cooling plate according to an embodiment of the present invention.

In terms of a method for manufacturing a cooling plate 10 according to an embodiment of the present invention, flux FL is applied to clad materials C1 and afterwards, an upper plate U and a lower plate D constituting the cooling plate 10 are coupled so as to come into contact with each other as illustrated in FIG. 5 (see FIG. 4).

In this case, the upper U and lower D plates have a predetermined shape. Accordingly, plastic working is performed such that the upper U and lower D plates have the predetermined shape (S100: plastic working step).

As illustrated in FIG. 7, the upper plate U is provided with an upper plate body U1 having a plate-body shape, and in the plastic working step (S100), port insertion holes U3, into which input and output ports P are inserted, and fixing holes U2, which fixes the upper plate in the state where the upper plate is coupled to the lower plate D, are formed at the upper plate body U1. Further, edges of the upper plate body U1 are rounded or grooved.

The lower plate D is provided with a lower plate body D1 whose inner part of the outer circumferential surface D7 is grooved, and in the plastic working step (S100), a partition wall D5, which protrudes towards the upper plate U so as to have a flow path, is formed at the center of the lower plate body D1.

In this case, each of the left and right spaces, which is partitioned by the partition wall D5 in the left and right directions in the drawing, has a separation wall D6 which protrudes in the same direction as the partition wall D5. With this configuration, cooling water, for instance, may flow from the left space to the right space in the drawing.

Further, the lower plate body D1 has fixing holes D2 which penetrate the lower plate body D1, and the fixing holes D2 are formed at positions where the fixing holes U2 of the upper plate body U1 are formed.

Further, the lower plate body D1 has other fixing holes D4 such that the cooling plate is fixed.

As described above, the upper U and lower D plates have different shapes. Accordingly, various kinds of plastic working such as foaming, trimming or piercing are needed such that the upper and lower plates have different shapes in the plastic working step (S100).

After the plastic working step (S100), the upper plate U and the lower plate D are preheated respectively at a certain temperature (S300: preheating step). Flux is applied to the preheated upper U and lower D plates. The upper plate U and the lower plate D are heated again at temperatures ranging from 210 to 230° C. so as to be coated with the flux (S400: coating step).

Then, the upper plate U and the lower plate D are heated in the state where the upper plate U and the lower plate D contact each other such that the upper plate U and the lower plate D are welded (S700: brazing step) after the upper plate U and the lower plate D are coated with the flux (S400: coating step).

That is, according to the present invention, the upper plate U and the lower plate D are preheated at a certain temperature, applied with flux, re-heated, coated with flux and brazed such that the upper plate U and the lower plate D are welded.

As a result, moisture existing in the flux is removed at first because flux is applied to the preheated upper D and lower U plates, and flux is re-heated so as to coat the upper plate U and the lower plate D, and all the moisture left in the flux is removed because the upper plate U and the lower plate D are heated at a certain temperature when being brazed.

In doing so, the upper plate U and the lower plate D are fixedly coated with the flux and are firmly welded together by the fixedly coated flux when being brazed.

Meanwhile, the flux may be applied to the side of clad materials C1 of the upper plate U and the lower plate D (see FIG. 4) and also, may be applied to the entire upper plate U and the lower plate D.

In the preheating step (S300), the upper plate U and the lower plate D are heated at temperatures ranging from 180° C. to 200° C. such that moisture existing in flux in a paste state is removed, and in the brazing step (S700), the upper plate U and the lower plate D are heated at temperatures ranging from 590° C. to 640° C. such that all the moisture left in the flux is removed thereby making it possible to firmly weld the upper plate U and the lower plate D.

As illustrated in FIG. 5, after the plastic working step (S100), the upper plate U and the lower plate D may be washed (S200: washing step).

This is to remove foreign substances in the washing step (S200) after the plastic working step (S100) because pressing or cutting often takes place in the state where various materials are applied in the plastic working step (S100).

Further, as illustrated in FIGS. 5 and 7, before the brazing step (S700), the flux-coated upper plate U is disposed to contact the flux-coated clad material C1 of the lower plate D, and an upper fixing device F1 and a lower fixing device F2 are disposed respectively at the upper surface of the upper plate U and the bottom surface of the lower plate D, and then, jigs 100 are respectively stacked on the upper surface of the upper fixing device F1 and the bottom surface of the lower fixing device F2 (S500: stacking step).

That is, the upper fixing device F1 and the lower fixing device F2 are disposed at the upper and lower sides of the assembled upper U and lower D plates, and jigs 100 are respectively positioned at the upper and lower sides of the upper fixing device F1.

This is to fix the upper plate U and the lower plate D in contact with each other in the brazing step (S700). Accordingly, the upper fixing device F1 and the lower fixing device F2 are stacked, and the stacked upper and lower fixing devices F1, F2 are fixed to each other by the jigs 100.

After the stacking step (S500), input and output ports P are installed in input and output port insertion holes U3 of the upper plate U (S600: input and output port installing step).

To be sure, as illustrated in FIG. 6, the input and output port installing step (S600) and stacking step may be performed (S500) before the brazing step (S700).

As illustrated in FIG. 7, the jig 100 is used to fix the upper fixing device F1 and the lower fixing device F2, and as illustrated in FGI, 8, may include an upper jig 110 disposed at the upper portion of at the upper fixing device F1, a lower jig 120 disposed at the bottom surface of at the lower fixing device F2, and a fixing part 130 for fixing the upper jig 110 and the lower jig 120.

In this case, the upper jig 110 is provided with an upper jig body 111 with a ∩-shaped cross section.

The upper jig body 111 has a first insertion groove 112 which is formed at the upper portion of the end of one side of the upper jig body 111 in the longitudinal direction thereof.

Further, the upper jig body 111 has a second insertion groove 113 which is formed at the upper portion of the end of the other side of the upper jig body 111 in the longitudinal direction thereof and is formed in a direction perpendicular to the first insertion groove 112.

That is, in terms of the embodiment illustrated in FIG. 8, the first insertion groove 112 is formed at the left side of the upper jig body 111, and the second insertion groove 113 is formed at the right side of the upper jig body 111 in the drawing.

The lower jig 120 may be provided with a lower jig body 121 with a U-shaped cross section, which is symmetrical to the upper jig 110 in the up-down direction.

The fixing parts 130 include bases 131 which are respectively fixed to the inner floor surfaces of both sides of the lower jig body 111, screw parts 132 which are respectively installed at the bases 131, and locking parts 133 which are respectively screwed into the screw parts 132, and nuts may be used as the locking parts 133.

In this case, the upper jig 110 moves in the longitudinal direction thereof so as to insert the first insertion groove 112 into the screw part 132 thereby fixing the upper jig 110 at first.

Further, the upper jig 110 rotates around the screw part 132 so as to insert the other screw part 132 into the second insertion groove 113 thereby readily coupling the upper jig 110 and the lower jig 120, and afterwards the locking part 133 descends so as to press the upper surface of the upper jig 110 thereby fixing jigs 100 to each other.

With this configuration, the stacking step (S500) is performed and this step will be described in detail.

First, the lower jig 120 is disposed at the lowest layer, and the lower fixing device is disposed on the lower jig 120.

The upper and lower plates where clad materials contact each other are disposed on the lower fixing device, the upper fixing device is disposed on the upper plate, and on the top of this, the upper jig 110 is disposed in the same direction as the lower jig 120. However, in FIG. 8, the upper and lower fixing devices, and the upper and lower plates are not illustrated to make the drawing more clear.

The upper jig 110 and the lower jig 120 are disposed in this way such that the opened surface of the upper jig 110 and the opened surface of the lower jig 120 face each other.

In this case, as described above, the upper jig 110 moves in the longitudinal direction thereof so as to insert the first insertion groove 112 into the screw part 132 thereby fixing the upper jig 110 at first.

Afterwards, the upper jig 110 rotates around the screw part 132 so as to insert the other screw part 132 into the second insertion groove 113, and the locking part 133 descends such that the jig 100 is readily installed.

Meanwhile, if the jig is heavy, the above-described stacking or separating step is not readily performed. Accordingly, as illustrated in FIG. 9, another jig 200 may be used.

The jig 200, as illustrated in FIG. 9, may include an upper jig 210 disposed at the upper portion of the upper fixing device F1, a lower jig 220 disposed at the bottom surface of the lower fixing device F2, and a fixing part 230 for fixing the upper jig 210 and the lower jig 220.

In this case, the upper jigs 210 include a first upper jig 211 and a second upper jig 212 which are disposed above and below to be perpendicular to each other, and coupling grooves Y are respectively formed at parts where the first upper jig 211 and the second upper jig 212 are crossed such that the upper jigs 210 are cross-stacked.

Similarly, the lower jigs 220 include a first lower jig 221 and a second lower jig 222 which are disposed above and below to be perpendicular to each other, and coupling grooves Y are respectively formed at parts where the first lower jig 221 and the second lower jig 222 are crossed.

That is, a pair of the upper jigs 210 may be disposed above and below and a pair of the lower jigs 220 may be disposed above and below by means of the coupled grooves Y.

In this case, the jig 200 and the coupling grooves Y may have different shapes. However, as illustrated in FIG. 9, the first upper jig 211 is provided with first upper jig bodies 211A with a ∩-shaped cross section, and first upper coupling grooves 211B are formed at the first upper jig bodies 211A.

The first upper coupling grooves 211B is a portion where the upper surface of the first upper jig bodies 211A and a part of both side adjacent to the upper surface of the first upper jig bodies 211A are opened, and the opened part at both sides is opened to a certain height from the upper portion.

Further, the second upper jig 212 is provided with second upper jig bodies 212A with a ∩-shaped cross section. Second upper coupling grooves 212B formed at the second upper jig bodies 212A have a part opened from the floor of both sides of the second upper jig bodies 212A in the height direction.

With the above-described shape, the second upper jig 212 is disposed on the first upper jig 211 with such a shape, and to this end, the second upper coupling grooves 212B are coupled to the first upper coupling grooves 211B.

In this case, the floor surfaces of the first upper jig 211 and the second upper jig 212 have the same height so as to put fixed pressure on the upper fixing device F1.

Meanwhile, the lower jig 220 is symmetrical to the upper jig 210 in the height direction. The first lower jigs 221, as illustrated, are provided with first lower jig bodies 221A with a U-shaped cross section and include first lower coupling grooves 221B where parts of the first lower jig bodies 221A are opened from the upper end of the first lower jig bodies 221A out of both sides thereof in the height direction thereof.

Further, the second lower jigs 222 are provided with second lower jig bodies 222A with a U-shaped cross section and include second lower coupling grooves 222B where the floor surface of the second lower jig bodies 222A and a part of both side adjacent to the floor surface of the second lower jig bodies 222A are opened, and the opened part at both sides is a part opened from the floor surface in the height direction.

The first lower jigs 221 are disposed in a certain direction (in the left-right direction in FIG. 9), and afterwards, the second lower jigs 222 are disposed on the first lower jigs 221 in the perpendicular direction (in the front-rear direction in FIG. 9). In this case, the second lower coupling grooves 222B are coupled to the first lower coupling grooves 221B as described above.

Further, the lower fixing device F2 is disposed on the lower jig 220, and the upper and lower plates where clad materials C1 contact each other are disposed on the lower fixing device F2.

Then, the first upper jig 211 is disposed on the upper plate U in the same direction as the second lower jig 222 (in the front-rear direction in FIG. 9), and on the top of it, the second upper jig 212 is disposed in the same direction as the first lower jig 221 (in the left-right direction in FIG. 9).

In this case, the second upper coupling grooves 212B are coupled to the first upper coupling grooves 211B as described above.

Accordingly, the lower fixing device F2 is disposed on the lower jig 220, and on the top of this, the lower fixing device F2 is disposed on the lower jig 220, and the upper U and lower D plates where clad materials C1 contact each other, and on the top of it, the upper fixing device F1 and the upper jig 210 are stacked.

Meanwhile, the stacked upper and lower fixing devices F1, F2 need to be fixed to each other by mean of the jig 200. To this end, as illustrated in FIGS. 9 to 11, opened parts O are formed at a part of the upper surfaces of both sides of the second upper jig 212, and fixing parts 230 are installed at the first lower jig 221.

In this case, the fixing parts 230 include bases 231 which are respectively fixed to the inner floor surfaces of both sides of the second lower jig 221, screw parts 232 which are respectively installed at the bases 231, locking parts 233 which are respectively screwed into the screw parts 232, and sliding members 234 which are movably installed at the second upper jig 212.

The screw part 232 and locking part 233 are installed at the first lower jig 221 and penetrate the opened part O of the second upper jig 212 such that the screw part and locking part are exposed. To this end, the opened part O is configured to be larger than the screw part 232 and the locking part 233.

The sliding member 234 is movably installed along the longitudinal direction of the second upper jig 212, and to this end, the sliding member 234 is configured to have a n shape which is similar to that of the second upper jig 212 and larger than that of the second upper jig so as to be installed at the second upper jig 212.

The sliding members 234, as illustrated, are provided with opened slits 234A which are formed from both ends of the second upper jig 212 towards the center thereof (from the left and right side ends towards the center in FIG. 9) to have a certain length such that the screw part 232 is inserted.

With such a configuration, the jig 200 and the upper and lower fixing devices F1, F2 may be fixed or released from fixation.

First, when the upper jig 210 and the lower jig 220 are fixed, the sliding member 234 installed on the second upper jig 212 is disposed to cover the opened part O. In this case, because the screw part 232 and locking part 233 are exposed through the opened part O, when the sliding member 234 covers the opened part O, the screw part 232 is inserted into the opened slit 234 A of the sliding member 234.

In this case, when the locking part 233 descends to press the sliding member 234, the second upper jig 212 and the first lower jig 211 are fixed to each other because the screw part 232 to which the locking part 233 is coupled is fixed to the first lower jig 211.

Accordingly, the first upper jig 211, the upper and lower fixing devices F1, F2, the upper plate U and the lower plate D disposed between the second upper jig 212 and first lower jig 211 are all fixed.

If the upper jig 210 is desired to separate, the locking part 233 coupled to the screw part 232 ascends such that the sliding member 234 is released from fixation. Then, the opened part O is exposed by the sliding member 234 such that the second upper jig 212 is separated from the first upper jig 211.

Because the opened part O of the second upper jig 212 is larger than the locking part 233 and the screw part 232 as described above, the second upper jig 212 may be separated from the first upper jig 211 even when the locking part 233 is not separated.

According to the present invention, the upper jig 210 may be easily separated.

Meanwhile, the coupling groove Y, as illustrated in FIG. 9, may have a shape with an opened part 211B, 212B, 221B, 222B and also have a slit 212C, 221C shape with a certain width.

Meanwhile, after the brazing step (S700), the step of testing whether the welded upper U and lower D plates are leaked may be performed as illustrated in FIGS. 5 and 6 (S900: leakage testing step).

A test device 300 necessary for the leakage testing step (S900), as illustrated in FIG. 12, is installed at a press part 310, which is ascendably and descendably installed, and at the bottom surface thereof and may include a base part 320 at which the welded upper U and lower D plates are installed.

In this case, the press part 310 may have fluid injection parts 330 installed at one side of the press part 310 so as to inject fluid into the welded upper U and lower D plates.

The fluid injection parts 330 are coupled to the input and output ports P by means of the descending of the press part 310 such that fluid is injected between the welded upper U and lower D plates.

In this case, the press part 310 may include a press body 311 having a plate-body shape and mounting grooves 312 where one side of the press body 311 is grooved such that the fluid injection parts 330 are installed.

The fluid injection parts 330 deliver fluid provided by outer supply sources (invisible) to the input and output ports P. Detailed description and illustration on technologies regarding this will be omitted because such technologies are widely known.

The base part 320 may have guide units 350 which are installed on the base part 320 in the direction of the press part 310 (in the upper direction in FIG. 12) so as to be inserted into coupling grooves 313 of the press part 310.

The press part 310, as described above, moves in the up-down direction. In particular, the press part 310 has the guide units 350 which guide the press part 310 such that the press part descends into an exact position when the press part 310 descends, and the guide units 350 are inserted into the coupling grooves 313 of the press part 310.

As described above, the upper U and lower D plates that are welded together are installed at the base part 320, and the installed upper and lower plates protrude from the bottom surface of the base part 320 as much as the thickness of the installed upper and lower plates.

Accordingly, the press part 310 needs to stay away from the base part 320 as much as the thickness of the protruding upper and lower plates such that the upper U and lower D plates are not broken.

To this end, the guide units 350 have space units 340 at one side of the guide units such that the press part 310 stays away from the base part 320 as much as the thickness of the upper U and lower D plates protruding from the base part 320 when the press part 310 descends.

In this case, the space unit 340 has a thickness as high as the thickness of the upper U and lower D plates protruding from the base part 320 and is installed at the base part 320. Accordingly, because of the space unit 340, the press part 310 may keep a certain distance from the base part 320 when the press part 310 descends.

Further, the space unit 340, as illustrated, may have a contact surface 341 that has a thickness corresponding to the thickness of the upper U and lower D plates protruding from the base part 320, and a fixing surface 342 that is installed at one side of the contact surface 341 and has a high thickness so as to be fixed to the base part 320.

The guide unit 350 is inserted into the coupling groove 313 of the press part 310. In this case, to buffer any possible shock, the guide unit 350 may include a fixation part 353 that is installed at the base part 320 and has an elastic part 352 around the fixation part 353, and an ascending and descending part 351 that is installed on the fixation part 353 and ascend and descends as illustrated in FIG. 12.

The ascending and descending part 351, as illustrated, have a hollow shape and an opened lower surface such that the fixation parts 353 are inserted into the ascending and descending parts.

In this case, the elastic part 352 installed around the fixation part 353 is caught and compressed by the lower end of the ascending and descending part 351 so as to buffer a shock.

Meanwhile, the thick surface of the ascending and descending part 351 has a plurality of through holes 352, and fixation balls 354 are installed in the through holes 352.

When the ascending and descending part 351 is inserted into the coupling groove 313 of the press part 310, the fixation balls 354 contact the inside of the coupling groove 313 so as to be moved inside and fixed to the ascending and descending parts 351. As a result, the fixation balls are forced to be inserted because the fixation balls 354 contact the inside of the coupling groove 313.

Accordingly, when the press part 310 descends, the ascending and descending parts 351 also descend, and the elastic parts 352 buffer a shock that takes place when the press part 310 descends.

As illustrated in FIGS. 5 and 6, before the leakage testing step (S900), a step of washing foreign substances generated in the brazing step (S700) may be performed (S800: washing step).

As illustrated in FIGS. 5 and 6, in an input and output port installing step (S500), clad rings 400 made from clad materials are installed at portions where the input and output ports P and the upper plate U come into contact, and in a brazing step (S700), the input and output ports P and the upper plate U may be firmly welded by means of the clad rings 400.

The input and output ports have protrusion parts that protrude outwards at positions spaced upwards apart from the lower end of the input and output ports, and the clad rings into which the lower portions of the input and output ports are inserted are caught by the protrusion parts and provided at the input and output ports. The lower ends of the input and output ports protrude from the clad rings. When the input and output port—i.e. a part that protrudes from the lower portion of the clad ring—is inserted into the port insertion hole, the clad ring is positioned between the upper surface of the upper plate and the protrusion part of the input and output port.

In this case, the input and output ports P, as illustrated in FIG. 13, may be provided with the clad materials C1, or as described above, may not be provided with the clad materials C1 because the input and output ports P are provided with the clad rings 400.

FIG. 14 is a schematic diagram illustrating a method for manufacturing a cooling plate according to another embodiment of the present invention, FIG. 15 is an exploded perspective view illustrating an example of a cooling plate of the present invention, FIG. 16 is a schematic diagram illustrating input and output ports welded to an upper plate in terms of a cooling plate at which a method of the present invention may be applied, FIG. 17 is a flow chart illustrating a method for manufacturing a cooling plate according to another embodiment of the present invention, and FIG. 18 is a flow chart illustrating a method for manufacturing a cooling plate according to yet another embodiment of the present invention.

In terms of a method for manufacturing a cooling plate 10 according to another embodiment of the present invention, the cooling plate has an upper plate U and a lower plate D made from the basic material of aluminum.

In this case, as illustrated in FIGS. 14 and 17, anti-oxidation layers N are respectively formed at the upper plate U and the lower plate D (S100: anti-oxidation layer forming step).

Then, plastic working is performed to the upper and lower plates (S200: plastic working step).

After the plastic working step (S200), solder S is applied on a contacted part between the upper plate U and the lower plate D (S400: solder applying step).

Then, in the state where the upper plate U and the lower plate D contact each other, the upper plate U and the lower plate D are heated such that the solder is melted and that and the upper plate U and the lower plate D are welded (S500: heating and welding step).

As described above, the present invention uses solder unlike conventional methods. In general, solder contains lead that has harmful effects on the environment. When it comes to the present invention, solder without lead is used.

Solder is usually based on tin and is melted at 232° C. or so. The temperature is not higher than the recrystallization temperature of aluminum.

Accordingly, solder of the present invention may lower the temperature for welding thereby preventing lower strength and deformation of aluminum.

Meanwhile, various kinds of solder may be used, and as is widely known, solder may be based on tin and contain Cu, Ni Ga, In, Bi, Cd etc.

Meanwhile, when it comes to the present invention, as described above, the anti-oxidation layer forming step (S100) at which anti-oxidation layers N are respectively formed at the upper plate U and the lower plate D is performed first. This is because the upper and lower plates may be welded well when being welded by means of solder.

Accordingly, anti-oxidation layers N are formed at the upper U and lower D plates and afterwards, solder S is applied on a contacted part between the upper plate U and the lower plate D (S400: solder applying step).

Then, in the state where the upper plate U and the lower plate D contact each other, the upper plate U and the lower plate D are heated at a certain temperature for a certain period of time (S500: heating and welding step) such that the upper plate U and the lower plate D are welded together.

In this case, the temperature is not higher than the recrystallization temperature of the upper plate U and the lower plate D made from aluminum by means of the use of solder S.

As described above, the present invention may prevent lower strength and deformation of aluminum because the upper plate U and the lower plate D may be welded at a temperature which is not higher than the recrystallization temperature of aluminum.

Further, after the upper plate U and the lower plate D are welded, the washing and acid treating steps may be omitted because the present invention does not use flux.

Further, a conventional testing step may be omitted because the present invention causes no deformation and maintains strength as described above. Accordingly, the present invention helps to reduce the manufacturing costs.

Further, the present invention may lower the temperature for welding as described above, thereby significantly saving the costs of a furnace.

Meanwhile, in the anti-oxidation layer forming step (S100), anti-oxidation layers N are respectively formed at the upper U and lower D plates, and a nickel or zinc plate may be used to form the anti-oxidation layers N.

In this case, the anti-oxidation layer N, as illustrated in FIG. 14, may be configured to wrap the upper plate U and the lower plate D and also may be formed at a surface facing each other out of the upper U and lower D plates and at the port insertion holes (U3).

Further, a reflow soldering process, in which the solder S is applied at a part that will be contacted, may be needed such that the solder S is applied between the upper U and lower D plates. The reflow soldering process is widely used in manufacturing semiconductors. Accordingly, detailed description and illustration regarding the reflow soldering process will be omitted.

As described above, according to the present invention, anti-oxidation layers N are formed at the upper U and lower D plates, and afterwards, solder is put between the upper U and lower D plates to weld the upper U and lower D plates. In this case, AL3003 is used as a basic material for the upper U and lower D plates, and the thickness of nickel or zinc plating the upper U and lower D plates ranges from 10 μm to 30 μm. In the state where solder is applied to the upper U and lower D plates, the upper U and lower D plates are heated at 230° C. for 70 seconds.

That is, a certain period of time is spent until the heating temperature reaches 230° C. Accordingly, after the heating temperature reaches 230° C., the upper U and lower D plates are heated at 230° C. for 70 seconds.

Under such conditions, when the upper U and lower D plates are welded, strength increases by 400% and thanks to beautiful surfaces, flatness deviations decrease by 40% compared to those of related arts.

In a manufacturing process according to the above-described manufacturing method of the present invention, the strength of the basic material for the upper U and lower D plates is not lowered. Accordingly, aside from AL3003, AL3N03, AL3N33, AL3005, AL3N43, AL6951 with high thermal conductivity may be used.

Meanwhile, as illustrated in FIG. 17, the anti-oxidation layer forming step (S100) may be performed before the plastic working step (S200), and as illustrated in FIG. 18, the plastic working step (S200) may be performed before the anti-oxidation layer forming step (S100).

Below, detailed description will be provided with reference to FIGS. 15 to 17.

However, FIGS. 15 and 16 only illustrate an example of the cooling plate 10 to which the method of the present invention may be applied.

First, anti-oxidation layers N are respectively formed at the upper U and lower D plates (S100: anti-oxidation layer forming step). After the anti-oxidation layers N are formed, plastic working is performed to the upper U and lower D plates S200: plastic working step).

To be sure, as described above, the plastic working step (S200) may be performed before the anti-oxidation layer forming step (S100).

The upper plate U is provided with an upper plate body U1 having a plate-body shape, and in the plastic working step (S200), port insertion holes U3, into which input and output ports P are inserted, and fixing holes U2, which fixes the upper plate in the state where the upper plate is coupled to the lower plate D, are formed at the upper plate body U1. Further, edges of the upper plate body U1 are rounded or grooved.

The lower plate D is provided with a lower plate body D1 whose inner part of the outer circumferential surface D7 is grooved, and in the plastic working step (S100), a partition wall D5, which protrudes towards the upper plate U so as to have a flow path, is formed at the center of the lower plate body D1.

In this case, each of the left and right spaces, which is partitioned by the partition wall D5 in the left and right directions in the drawing, has a separation wall D6 which protrudes in the same direction as the partition wall D5. With this configuration, cooling water, for instance, may flow from the left space to the right space in the drawing.

Further, the lower plate body D1 has fixing holes D2 which penetrate the lower plate body D1, and the fixing holes D2 are formed at positions where the fixing holes U2 of the upper plate body U1 are formed.

Further, the lower plate body D1 has other fixing holes D4 such that the cooling plate is fixed.

In terms of the present invention, as described above, anti-oxidation layers may be formed at the upper U and lower D plates before the plastic working step, or the plastic working step may be performed before the anti-oxidation layers are formed at the upper U and lower D plates.

Meanwhile, after the anti-oxidation layer forming step (S100), the upper plate U and the lower plate D may be washed. This is to remove foreign substances after the plastic working step because pressing or cutting often takes place in the state where various materials are applied in the above-described plastic working step. To be sure, foreign substances, which remain after the anti-oxidation layers N are formed, may be washed away.

Then, before the solder applying step (S400), the input and output ports, which are made from aluminum and has a hollow pipe shape with an anti-oxidation layer N, are respectively inserted into and installed at the input and output port holes U3 formed at the upper plate U (S300: input and output port installing step).

Then, in the solder applying step (S400), solder is further applied between the input and output ports P and the upper plate U.

As illustrated in FIG. 16, the input and output ports P are inserted into and installed at the port insertion holes U3 at the upper plate U. Such input and output ports P have protrusion parts P1 such that the protrusion parts P1 contact the upper surface of the upper plate U.

Before the input and output ports P and the upper plate U are coupled, anti-oxidation layers N are formed at the input and output ports P. A nickel or zinc plate may be used to form the anti-oxidation layers N.

Further, the protrusion parts P1 of the input and output ports P contact the upper surface of the upper plate U. Accordingly, to be sure, anti-oxidation layers need to be formed at the upper surface of the upper plate U in advance.

To this end, in the solder applying step (S400), solder is applied between of the input and output ports P and the upper plate U.

That is, solder S is applied at a part contacting each other out of the input and output ports P and the upper plate U at which anti-oxidation layers N are formed—i.e. between the bottom surfaces of the protrusion parts P1 of the input and output ports P and the upper surface of the upper plate U.

To be sure, for the sake of convenience in work, anti-oxidation layers N may be formed and solder S may be applied at the entire part of the protrusion parts P1.

Further, solder S may be applied to the bottom surface of the upper plate U or the outer circumferential surface D7 of the lower plate D, which contact the bottom surface of the upper plate U.

Then, the solder S is melted such that the input and output ports P are respectively welded to the input and output port holes U3 at the upper plate U while the upper U and lower D plates are welded to each other (S500: heating and welding step).

Further, a cooling plate manufactured according to the above-described method of the present invention, more particularly, a battery stack cooling plate for an electric vehicle is also characterized in that the cooling plate includes an aluminum upper plate U having input and output port holes U3 and an aluminum lower plate D configured to be welded to the upper plate U, nickel or zinc layers are respectively formed at least at a part where the upper plate U and the lower plate D are welded, and a solder layer is melted, solidified and formed between the nickel or zinc layers of the upper U and lower D plates.

In this case, the thickness of the nickel or zinc layers ranges from 10 to 30 µm as described above.

Meanwhile, the present invention is described as a battery stack cooling plate for an electric vehicle. In this case, to be sure, the electric vehicle means not only a pure electric vehicle but also a hybrid electric vehicle.

The present invention has been described with reference to the detailed embodiments. However, the embodiments have been provided to explain the present invention in detail, and it is obvious that the present invention may be modified and improved in various forms by those skilled in the art to which the present invention pertains within the scope of the technical idea of the present invention.

Further, it should be understood that simple changes and modifications in the present invention belong to the scope of the present invention, and that the scope of the protection the present invention seeks is defined according to the appended claims.

INDUSTRIAL APPLICABILITY

According to the above-described invention, in the brazing step in which the upper and lower plates are welded, all the moisture remaining at flux is removed. Accordingly, the upper and lower plates are fixedly coated with the flux such that the upper and lower plates are firmly welded.

Further, according to the present invention, solder available at low temperatures is used to weld the upper and lower plates thereby preventing lower strength and deformation. Additionally, according to the present invention, conventional flux is not used such that a washing step and an acid treating step may be omitted thereby reducing the manufacturing costs.

The invention claimed is:

1. A method for manufacturing a battery stack cooling plate for an electric vehicle comprises a plastic working step in which plastic working is performed respectively to upper and lower plates constituting a cooling plate after a clad material is attached to each of the upper and lower plates, a preheating step in which the upper and lower plates are respectively preheated, a coating step in which the upper and lower plates are coated with flux, and a brazing step in which the upper and lower plates are heated and bonded in the state where the upper and lower plates contact each other, wherein after the brazing step, a step of testing whether the welded upper and lower plates are leaked is performed, and wherein a test device necessary for the leakage testing step is installed at a press part that is ascendably and descendably installed and at the bottom surface thereof and comprises a base part at which the welded upper and lower plates are installed; fluid injection parts are installed at one side of the press part so as to inject fluid between the welded upper and lower plates, guide units are installed on the base part in the direction of the press part so as to be inserted into coupling grooves of the press part, and space units are installed at one side of the guide units such that the press part stays away from the base part as much as the thickness of the upper and lower plates protruding from the base part when the press part descends.

2. The method for manufacturing a battery stack cooling plate for an electric vehicle according to claim 1, wherein in the preheating step, the upper plate and the lower plate are heated at temperatures ranging from 180° C. to 200° C.

3. The method for manufacturing a battery stack cooling plate for an electric vehicle according to claim 1, wherein in the brazing step, the upper plate and the lower plate are heated at temperatures ranging from 590° C. to 640° C.

4. The method for manufacturing a battery stack cooling plate for an electric vehicle according to claim 1, wherein before the brazing step, there are a stacking step in which the flux-coated upper plate is disposed to contact the clad material of the lower plate, and an upper fixing device and a lower fixing device are disposed respectively at the upper surface of the upper plate and the bottom surface of the lower plate, and then, jigs are respectively stacked on the upper surface of the upper fixing device and the bottom surface of the lower fixing device, and an input and output port installing step in which input and output ports are installed in port insertion holes of the upper plate.

5. The method for manufacturing a battery stack cooling plate for an electric vehicle according to claim 1, wherein before the brazing step, there are an input and output port installing step in which input and output ports are installed in port insertion holes of the upper plate, and a stacking step in which after the flux-coated upper and lower plates are assembled, an upper fixing device and a lower fixing device are disposed respectively at the upper surface of the assembled upper plate and the bottom surface of the assembled lower plate, and jigs are respectively stacked on the upper surface of the upper fixing device and the bottom surface of the lower fixing device.

6. The method for manufacturing a battery stack cooling plate for an electric vehicle according to claim 4, wherein in the input and output port installing step, clad rings made from clad materials are installed at portions where the input and output ports and the upper plate come into contact.

7. The method for manufacturing a battery stack cooling plate for an electric vehicle according to claim 4, wherein the jig comprises an upper jig disposed at the upper portion of at the upper fixing device, a lower jig disposed at the bottom surface of at the lower fixing device, and a fixing part for fixing the upper jig and the lower jig; the upper jig comprises an upper jig body with a U-shaped cross section, a first insertion groove which is formed at the upper surface of the end of the upper jig body in the longitudinal direction thereof and grooved in the longitudinal direction thereof, and a second insertion groove which is grooved at one side of the upper jig body in the transverse direction thereof and formed in a direction perpendicular to the first insertion groove; the lower jig comprises a lower jig body with a U-shaped cross section; the fixing parts comprise bases which are respectively fixed to the inner floor surfaces of both sides of the lower jig body, screw parts which are respectively installed at the bases, and locking parts which are respectively screwed into the screw parts; and in the stacking step, the lower jig is disposed at the lowest layer, and the lower fixing device is disposed on the lower jig, the upper and lower plates where clad materials contact each other are disposed on the lower fixing device, the upper fixing device is disposed on the upper plate, and on the top of this, the upper jig is disposed in the same direction as the lower jig, the upper jig moves in the longitudinal direction thereof so as to insert the first insertion groove to the screw part, the upper jig rotates around the screw part so as to insert the other screw part into the second insertion groove and afterwards, the upper jig and the lower jig are fixed to each other by means of the locking part.

8. The method for manufacturing a battery stack cooling plate for an electric vehicle according to claim 4, wherein the jig comprises an upper jig disposed at the upper portion of at the upper fixing device, a lower jig disposed at the bottom surface of at the lower fixing device, and a fixing part for fixing the upper jig and the lower jig; the upper jigs comprise a first upper jig and a second upper jig which are disposed above and below to be perpendicular to each other, and coupling grooves are respectively formed at crossed parts out of the first upper jig and the second upper jig; and the lower jigs comprise a first lower jig and a second lower jig which are disposed above and below to be perpendicular to each other, and coupling grooves are respectively formed at crossed parts out of the first lower jig and the second lower jig.

9. The method for manufacturing a battery stack cooling plate for an electric vehicle according to claim 8, wherein the first upper jig comprises first upper jig bodies with a U-shaped cross section, and first upper coupling grooves where the upper surface of the first upper jig bodies, and parts of both sides adjacent to the upper surface of the first upper jig bodies are opened, and where the opened parts at both sides are opened to a certain height from the upper portion of the first upper jig bodies, and the second upper jig comprises second upper jig bodies with a U-shaped cross section, and second upper coupling grooves where parts of the second upper jig bodies are opened from the floors of both sides of the second upper jig bodies; the first lower jigs comprise first lower jig bodies with a U-shaped cross section, and first lower coupling grooves where parts of the first lower jig bodies are opened from the upper end of the first lower jig bodies out of both sides thereof in the height direction thereof, and the second lower jigs comprise second lower jig bodies with a U-shaped cross section, and second lower coupling grooves where the floor surface of the second lower jig bodies and parts of both side adjacent to the floor surface of the second lower jig bodies are opened, and where the opened parts at both sides are opened from the floor surface the second lower jig bodies in the height direction thereof; the first lower jigs are disposed in a certain direction, and afterwards, on the top of this, the second lower jigs are disposed on the first lower jigs in the direction perpendicular to the first lower jigs, the second lower coupling grooves are coupled to the first lower coupling grooves, the lower fixing device is disposed on the lower jig, the upper and lower plates where clad materials contact each other are disposed on the lower fixing device, the first upper jig is disposed on the upper plate in the same direction as the second lower jig, and on the top of this, the second upper jig is disposed, and the second upper coupling grooves are coupled to the first upper coupling grooves.

10. The method for manufacturing a battery stack cooling plate for an electric vehicle according to claim 9, wherein opened parts are formed at parts of the upper surfaces of both sides of the second upper jig, and fixing parts are installed at the first lower jig, wherein the fixing parts comprise bases which are respectively fixed to the inner floor surfaces of both sides of the second lower jig, screw parts which are respectively installed at the bases, locking parts which are respectively screwed into the screw parts, and sliding members which are movably installed at the second upper jig, the screw parts and locking parts penetrate the opened parts of the second upper jig such that the screw part and locking parts are exposed, the sliding members are provided with opened slits which are formed from both ends of the second upper jig towards the center thereof to have a certain length such that the screw parts are inserted; when the upper jig and the lower jig are fixed, the sliding member installed on the second upper jig is disposed to cover the opened part, and afterwards, the locking part which is exposed by penetrating the opened part and the opened slit descends to press and fix the sliding member, the locking part coupled to the screw part ascends such that the sliding member is released from fixation when the upper jig is desired to separate, and the opened part is exposed by moving the sliding member such that the second upper jig is separated from the first upper jig.

* * * * *